United States Patent
Ikeji et al.

(10) Patent No.: US 8,561,286 B2
(45) Date of Patent: Oct. 22, 2013

(54) MANUFACTURING METHOD FOR A MAGNETIC HEAD SUPPORTING SUSPENSION

(75) Inventors: Yoichi Ikeji, Yokohama (JP); Kazuhiko Otake, Yokohama (JP)

(73) Assignee: NHK Spring Co., Ltd., Tokyo (JP)

( * ) Notice: Subject to any disclaimer, the term of this patent is extended or adjusted under 35 U.S.C. 154(b) by 694 days.

(21) Appl. No.: 12/728,425

(22) Filed: Mar. 22, 2010

(65) Prior Publication Data

US 2010/0242263 A1    Sep. 30, 2010

(30) Foreign Application Priority Data

Mar. 24, 2009    (CN) .......................... 2009 1 0129372

(51) Int. Cl.
 *G11B 5/48* (2006.01)
 *G11B 21/16* (2006.01)

(52) U.S. Cl.
 USPC .................. 29/603.03; 360/265.9; 360/266.1; 360/244.2; 360/244.8

(58) Field of Classification Search
 USPC ........ 29/603.03, 603.04, 603.2, 265.9, 266.1, 29/244.2, 244.3, 244.5, 244.8; 360/265.9, 360/266.1, 244.2, 244.3, 244.5, 244.8
 See application file for complete search history.

(56) References Cited

U.S. PATENT DOCUMENTS 6,571,455 B2 *   6/2003   Takagi et al. .............. 29/603.03
7,386,932 B2 *   6/2008   Girard .................... 360/244.2 X

FOREIGN PATENT DOCUMENTS

| JP | 07169217 A | * | 7/1995 |
| JP | 2000-163904 | | 6/2000 |
| JP | 2002-133808 | | 5/2002 |

* cited by examiner

*Primary Examiner* — A. Dexter Tugbang
(74) *Attorney, Agent, or Firm* — Holtz, Holtz, Goodman & Chick, PC

(57) ABSTRACT

A manufacturing method for a magnetic head supporting suspension includes forming a load beam blank having a load beam with a dimple formed therein, and a frame portion with a positioning part formed therein; and forming a flexure blank having a flexure and a frame portion. A fitting portion in the flexure blank is fittable to the positioning part. An anti-rotation portion is formed on the load beam blank or a member attached to the load beam blank. A receiving portion in the flexure blank is fittable to the anti-rotation portion. The load beam blank and flexure blank are superposed with the positioning part fitted to the fitting portion. The anti-rotation portion is fitted to the receiving portion, and the flexure is fixed to the load beam. The load beam and flexure are thereafter separated from the frame portions.

5 Claims, 8 Drawing Sheets

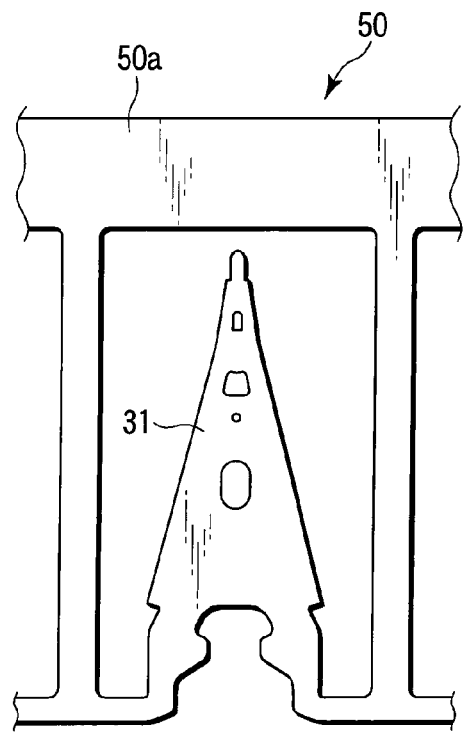
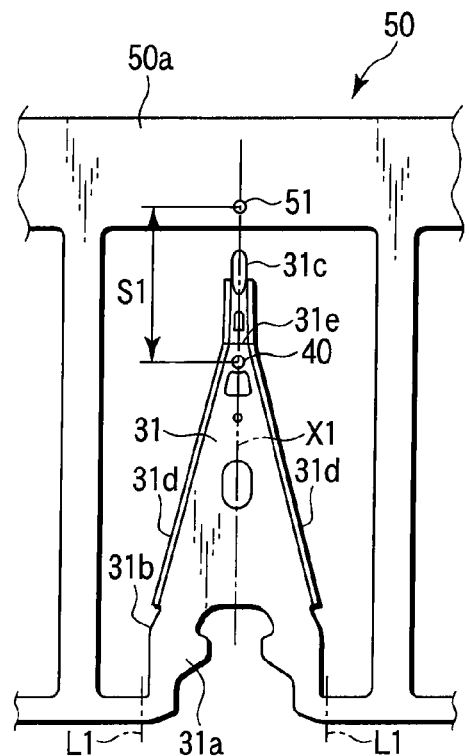
F I G. 1A     F I G. 1B
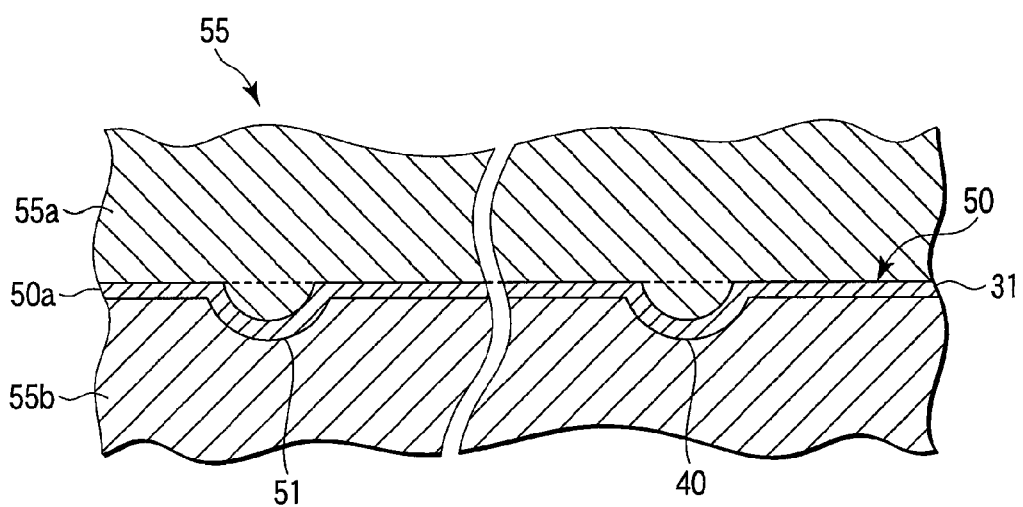
F I G. 1C

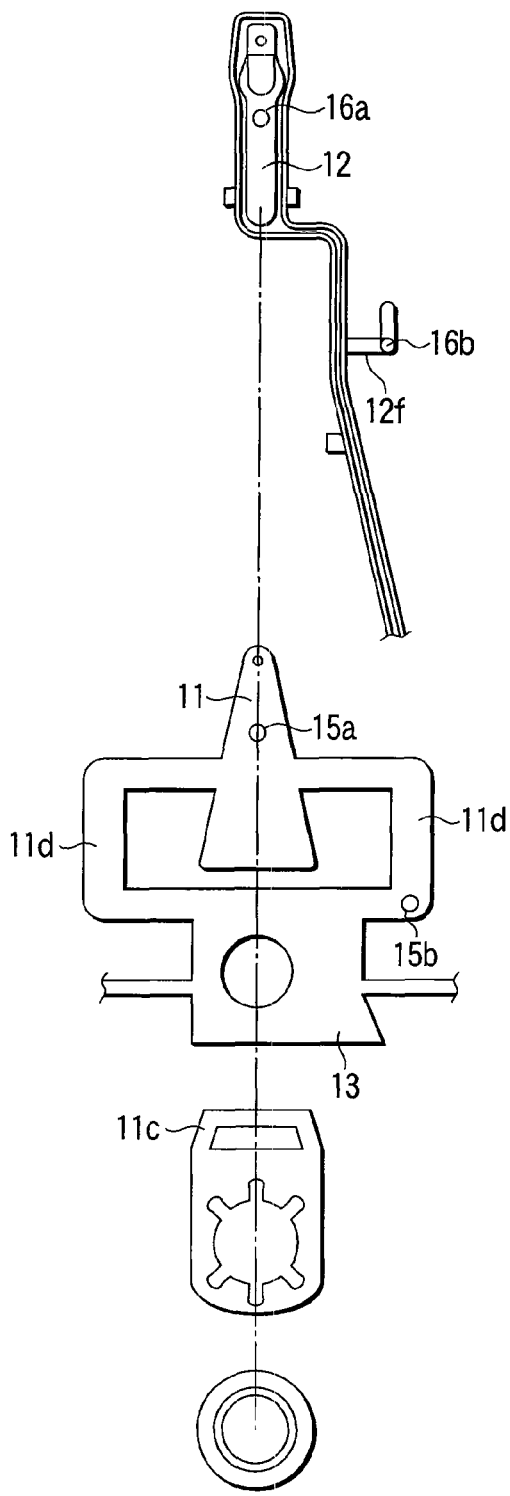
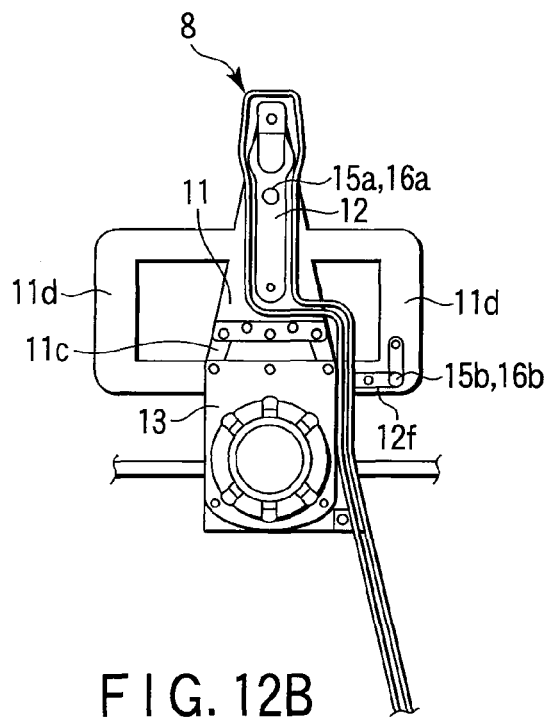
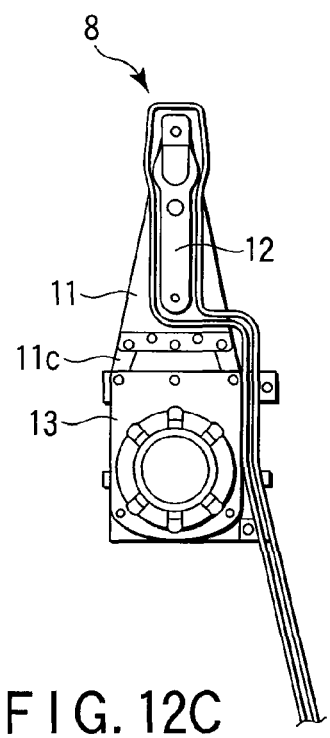
F I G. 12A
PRIOR ART
F I G. 12B
PRIOR ART
F I G. 12C
PRIOR ART

MANUFACTURING METHOD FOR A MAGNETIC HEAD SUPPORTING SUSPENSION

CROSS-REFERENCE TO RELATED APPLICATIONS

This application is based upon and claims the benefit of priority from prior Chinese Patent Application No. 200910129372.3, filed Mar. 24, 2009, the entire contents of which are incorporated herein by reference.

BACKGROUND OF THE INVENTION

1. Field of the Invention

The present invention relates to a manufacturing method for a magnetic head supporting suspension built in an information processing apparatus, such as a personal computer, and a suspension assembly including a load beam blank and flexure blank.

2. Description of the Related Art

FIG. 4 shows a part of a hard disk drive (HDD) 1. A carriage 2 of the disk drive 1 is turned around a shaft 2a by a positioning motor 3, such as a voice coil motor. The motor 3 comprises magnets 4. The carriage 2 comprises a coil portion 5 located near the magnets 4, arms 6, suspensions 7, magnetic heads 8, etc. Arms (or actuators) 6 are fixed to the coil portion 5. The suspensions 7 are mounted on the arms 6, individually. The magnetic heads 8 are located individually on the respective distal end portions of the suspensions 7. If the carriage 2 is actuated by the motor 3, each magnetic head 8 moves to a desired track (recording surface) of a disk 9.

Each magnetic head 8 comprises a slider 10 and a transducer (not shown) disposed on the slider 10. The slider 10 is disposed in a position where it can face the desired track of the disk 9. If the disk 9 rotates at high speed, an air bearing is formed between the slider 10 and a surface of the disk 9, and the slider 10 flies slightly above the disk surface. The height of this flight is called a flying height.

FIG. 5 shows an example of a prior art suspension 7'. FIG. 6 shows a gimbal portion of the suspension 7'. The suspension 7' comprises a load beam 11, flexure 12 fixed to the load beam 11, and baseplate 13. The load beam 11 is a precise thin-plate spring. The flexure 12 is a plate spring thinner than the load beam 11. The baseplate 13 is fixed to the proximal portion of the load beam 11. The load beam 11 comprises a beam body portion 11a to which the flexure 12 is fixed, proximal portion 11b to which the baseplate 13 is fixed, and hinge portion 11c. The hinge portion 11c connects the body portion 11a and proximal portion 11b and serves as a spring. In another example of the suspension, the body portion 11a, proximal portion 11b, and hinge portion 11c are formed independently of one another. In this case, the body portion 11a, proximal portion 11b and hinge portion 11c are referred to as a load beam, base member, and hinge member, respectively.

The slider 10 is mounted on a tongue portion 12a that is formed on the distal end portion of the flexure 12. The stiffness of the flexure 12 is considerably reduced to allow the slider 10 to change its posture while it is flying above the disk 9. The load beam 11 and flexure 12 are superposed as they are fixed to each other by laser welding or the like. The flexure 12 shown in FIG. 6 is a so-called "flexure with conductors", which comprises a conductive member 12b.

A dimple 14 is disposed on the distal end portion of the load beam 11. The dimple 14 is a hemispherical protuberance projecting toward the slider 10. Since it is hollow on the backside of the load beam 11, however, this protuberance is referred to as a "dimple" in the art. The tip of the dimple 14 contacts the tongue portion 12a of the flexure 12. Thus, the magnetic head 8 can be displaced three-dimensionally in a pitching direction (indicated by arrow P in FIG. 6), rolling direction (indicated by arrow R), etc., around the dimple 14. The dimple 14 may be provided on the tongue portion 12a of the flexure 12 instead of being disposed on the load beam 11.

In fixing the load beam 11 and flexure 12 together, they need to be accurately positioned with respect to each other. Conventionally, for this purpose, reference holes 15 and 16 (FIG. 7) are bored through the load beam 11 and flexure 12, respectively. A jig pin 17 can be inserted into the reference holes 15 and 16. The load beam 11 and flexure 12 are clamped between a pad 18 and retaining member 19. In this clamped state, the load beam 11 and flexure 12 are fixed to each other by laser welding or the like.

In the prior art example described above, the load beam 11 or flexure 12 may be damaged by the jig pin 17 as the pin is inserted into reference holes 15 and 16. To avoid this, clearances should be secured between the outer peripheral surface of the jig pin 17 and the respective inner peripheral surfaces of the reference holes 15 and 16. In this case, as shown in FIG. 8, the reference holes 15 and 16 may be laterally dislocated by a margin corresponding to clearances C1 and C2. Thus, the load beam 11 and flexure 12 are decentered for (C1+C2)/2 at the maximum.

If the dislocation (or decentering) occurs between the load beam 11 and flexure 12, moments on the slider 10 are unbalanced. It is known that the flying height properties of the slider 10 relative to the disk 9 are greatly influenced by the moments on the slider 10. Thus, in order to obtain stable flying height properties, the moment in the rolling direction, in particular, should be prevented from becoming unbalanced.

The unbalance of the moment in the rolling direction is attributable to the static roll angle and dislocation of the dimple. In an example shown in FIG. 9, a dimple 14 is disposed on a flexure 12. In this case, the eccentricity of the flexure 12 relative to the load beam 11 directly causes a dimple dislocation ΔD, and the moment is unbalanced. In an example shown in FIG. 10, a dimple 14 is disposed on a load beam 11. In this case, the eccentricity between the load beam 11 and flexure 12 causes a moment deviation ΔM. Thus, unbalance of the moment attributable to the static roll angle occurs.

In order to obtain stable flying height properties, therefore, the eccentricity between the load beam 11 and flexure 12 needs to be minimized. Thus, it is very important to align the constituent members of the suspension with one another. In particular, high alignment accuracy is required for the relative positions of the dimple and the tongue portion of the flexure on which the slider is mounted. Actually, however, the accuracy of assembly of the load beam 11 and flexure 12 varies, so that it is difficult to obtain stable flying height properties.

If the relative positions of the load beam 11 and flexure 12 are misaligned, the following problems occur. With the recent demand for smaller heads, flexures with conductors have been put to practical use. In the suspension comprising the conductive member 12b, as shown in FIG. 6, for example, electrode pads 12c are mounted on the flexure 12. Thus, dislocation of the flexure 12 relative to the load beam 11 causes dislocation of the electrode pads 12c. In some cases, this dislocation may hinder the connection between the electrode pads 12c and terminals 8a on the head 8.

Jpn. Pat. Appln. KOKAI Publication No. 2000-163904 (Patent Document 1) discloses a suspension of which a load beam and flexure can be positioned with respect to each other.

In this suspension, as shown in FIG. 11, a pair of reference holes 20 and 21 are formed in one of a load beam 11 and flexure 12. A pair of burred holes 22 and 23 comprising projecting edges 22a and 23a are formed in the other of the load beam 11 and flexure 12. The load beam 11 and flexure 12 are positioned by inserting the projecting edges 22a and 23a of the burred holes 22 and 23 into the reference holes 20 and 21, respectively.

If the burred holes 22 and 23 are formed in the load beam 11 or flexure 12, however, contamination may be caused around them during their burring work. Further, contamination may also be caused when the projecting edges 22a and 23a are inserted into the reference holes 20 and 21, respectively. The contamination is harmful to disk drives. With additional miniaturization of modern suspensions, moreover, the pitch between the reference holes 20 and 21 has been reduced so much that it has become difficult to obtain satisfactory positioning accuracy.

Jpn. Pat. Appln. KOKAI Publication No. 2002-133808 (Patent Document 2) discloses a suspension in which the pitch between reference holes can be widened. In this suspension, as shown in FIG. 12A, reference holes 15a and 15b are formed in a load beam 11 and one of junctions 11d, respectively. Likewise, reference holes 16a and 16b are formed in a flexure 12 and extending portion 12f, respectively. A hinge portion 11c is formed independently of the load beam 11. As shown in FIG. 12B, the load beam 11 and flexure 12 are superposed on each other, and a first jig pin is then inserted into the reference holes 15a and 16a, and a second jig pin into the reference holes 15b and 16b. In this state, the load beam 11 and flexure 12 are laser-welded together. Thereafter, the junctions 11d are cut off, whereupon the suspension shown in FIG. 12C is completed. However, even this example is not a solution to the problem of the clearances between the reference holes and jig pins.

In the suspension of which the load beam 11 and hinge portion 11c are formed independently of each other, moreover, the flexure 12 is expected to be accurately positioned with respect to the load beam 11 and hinge portion 11c.

BRIEF SUMMARY OF THE INVENTION

The object of the present invention is to provide a suspension manufacturing method, in which the relative positions of members, that is, a load beam and flexure, constituting a magnetic head supporting suspension, or more specifically, of a dimple on one of the members and the other member, can be accurately regulated, and contamination can be suppressed, and a suspension assembly.

A first manufacturing method according to the invention is applied to a suspension in which a dimple is disposed on a load beam, and comprises steps of: forming a load beam blank comprising the load beam and a frame portion continuous with the load beam; forming a flexure blank comprising a flexure and a frame portion continuous with the flexure; forming the dimple on that part of the load beam which corresponds in position to a tongue portion of the flexure and forming a positioning part on the frame portion of the load beam blank; forming a fitting portion in that part of the flexure blank which corresponds in position to the positioning part, the fitting portion being fittable to the positioning part; forming an anti-rotation portion on the load beam blank or a member attached to the load beam blank; forming a receiving portion in that part of the flexure blank which corresponds in position to the anti-rotation portion, the receiving portion being fittable to the anti-rotation portion; superposing the load beam blank and the flexure blank on each other and fitting the positioning part to the fitting portion; fitting the anti-rotation portion to the receiving portion; fixing the flexure to the load beam; and separating the load beam and the flexure from the frame portions of the load beam blank and the flexure blank, respectively, after the fixing.

According to this first manufacturing method, the accuracy of the relative positions of the tongue portion of the flexure and the dimple that constitute a gimbal portion of the suspension is improved. Thus, high alignment accuracy can be obtained for the dimple and the tongue portion on which a slider is mounted.

A second manufacturing method according to the invention is applied to a suspension in which a dimple is disposed on a flexure, and comprises steps of: forming a load beam blank comprising a load beam and a frame portion continuous with the load beam; forming a flexure blank comprising the flexure and a frame portion continuous with the flexure; forming the dimple on the flexure and forming a positioning part on the frame portion of the flexure blank; forming an anti-rotation portion on that part of the flexure blank which is different in position from the positioning part; forming a fitting portion in that part of the load beam blank which corresponds in position to the positioning part, the fitting portion being fittable to the positioning part; forming a receiving portion in the load beam blank or a member attached to the load beam blank, the receiving portion being fittable to the anti-rotation portion; superposing the load beam blank and the flexure blank on each other and fitting the positioning part to the fitting portion; fitting the anti-rotation portion to the receiving portion; fixing the flexure to the load beam; and separating the load beam and the flexure from the frame portions of the load beam blank and the flexure blank, respectively, after the fixing.

According to this second manufacturing method, the accuracy of the relative positions of the load beam and the dimple that constitutes a gimbal portion of the suspension is improved. Thus, high alignment accuracy can be obtained for the dimple and the slider mounted on the tongue portion of the flexure.

These methods may further comprise a step of fixing a hinge member to the load beam. Further, the dimple and the positioning part may be formed in a single step using a single die set. Furthermore, the dimple and the positioning part may be formed in first and second steps, respectively, using the single die set. Alternatively, the dimple and the positioning part may be separately formed using two die sets.

A load beam blank of a first suspension assembly according to the present invention comprises a load beam comprising a dimple, a frame portion continuous with the load beam and comprising a cuttable portion at which the frame portion is expected to be cut off from the load beam, a positioning part (e.g., a positioning projection) formed on the frame portion and configured to position the load beam blank with respect to a flexure blank, and an anti-rotation portion configured to prevent the load beam blank from rotating with respect to the flexure blank.

The flexure blank of the first suspension assembly comprises a flexure comprising a tongue portion which contacts the dimple, a frame portion continuous with the flexure and comprising a cuttable portion at which the frame portion is expected to be cut off from the flexure, a fitting portion (e.g., a reference hole) formed in that part of the frame portion which corresponds in position to the positioning part and fittable to the positioning part, and a receiving portion formed in a position corresponding to the anti-rotation portion and fittable to the anti-rotation portion.

A flexure blank of a second suspension assembly according to the present invention comprises a flexure comprising a dimple, a frame portion continuous with the flexure and comprising a cuttable portion at which the frame portion is expected to be cut off from the flexure, a positioning part (e.g., a positioning projection) formed on the frame portion and configured to position the flexure blank with respect to a load beam blank, and an anti-rotation portion configured to prevent the flexure blank from rotating with respect to the load beam blank.

The load beam blank of the second suspension assembly comprises a load beam comprising a part which contacts the dimple, a frame portion continuous with the load beam and comprising a cuttable portion at which the frame portion is expected to be cut off from the load beam, a fitting portion (e.g., a reference hole) formed in a position corresponding to the positioning part and fittable to the positioning part, and a receiving portion formed in a position corresponding to the anti-rotation portion and fittable to the anti-rotation portion.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1A is a plan view of a load beam blank according to one embodiment of the invention after bending work;

FIG. 1B is a plan view of the load beam blank shown in FIG. 1A after the bending work;

FIG. 1C is a sectional view of a die set and a part of the load beam blank shown in FIG. 1B;

FIG. 12A is an exploded plan view showing constituent members of another prior art suspension;

FIG. 12B is a plan view showing the members shown in FIG. 12A in a superposed state; and FIG. 12C is a plan view of the suspension formed of the members shown in FIG. 12A.

DETAILED DESCRIPTION OF THE INVENTION

One embodiment of the present invention will now be described with reference to FIGS. 1 to 4.

Figures 2A, 2B:
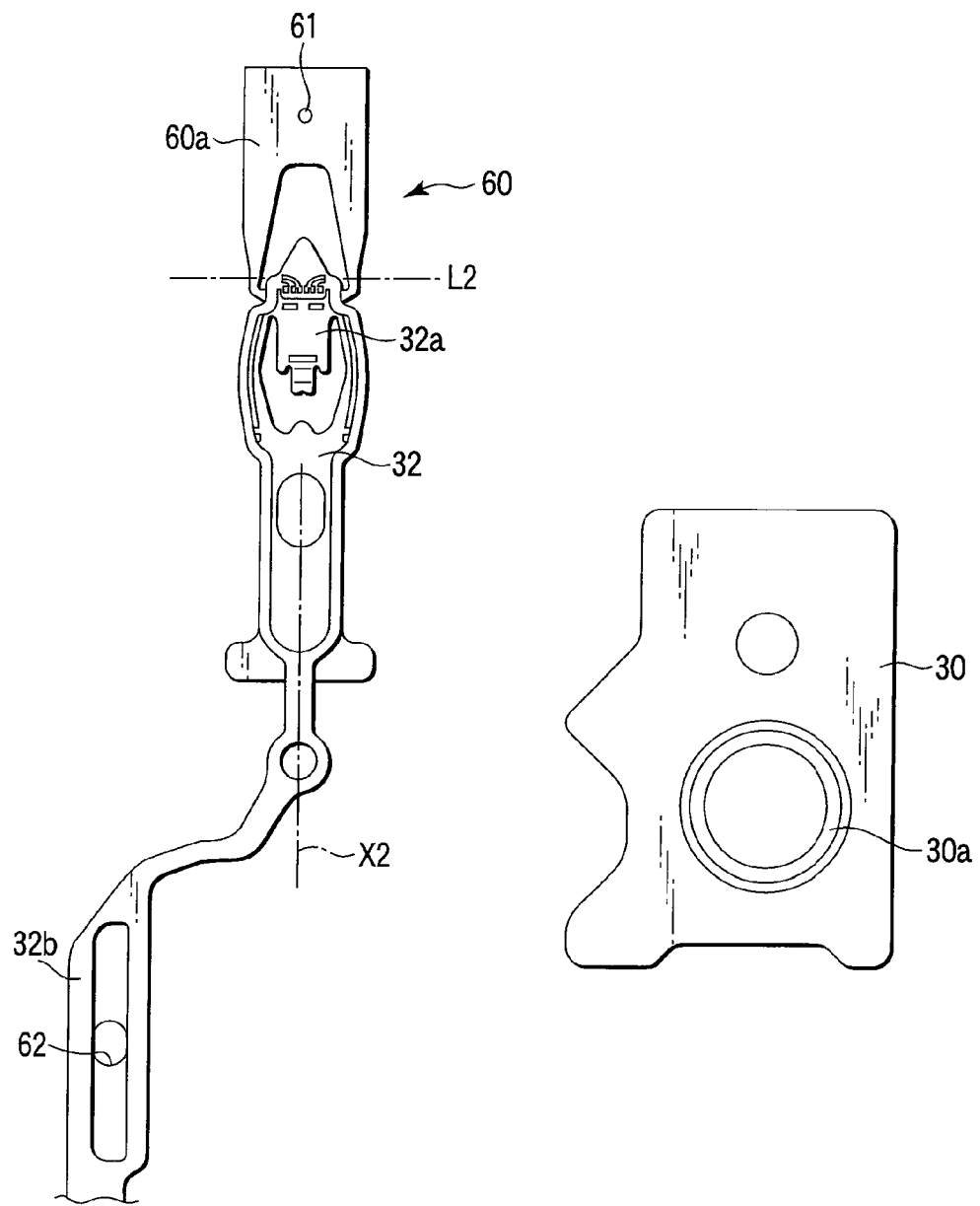
FIG. 2A is a plan view of a flexure blank according to the one embodiment of the invention.
FIG. 2B is a plan view of a baseplate.
Figure 2C:
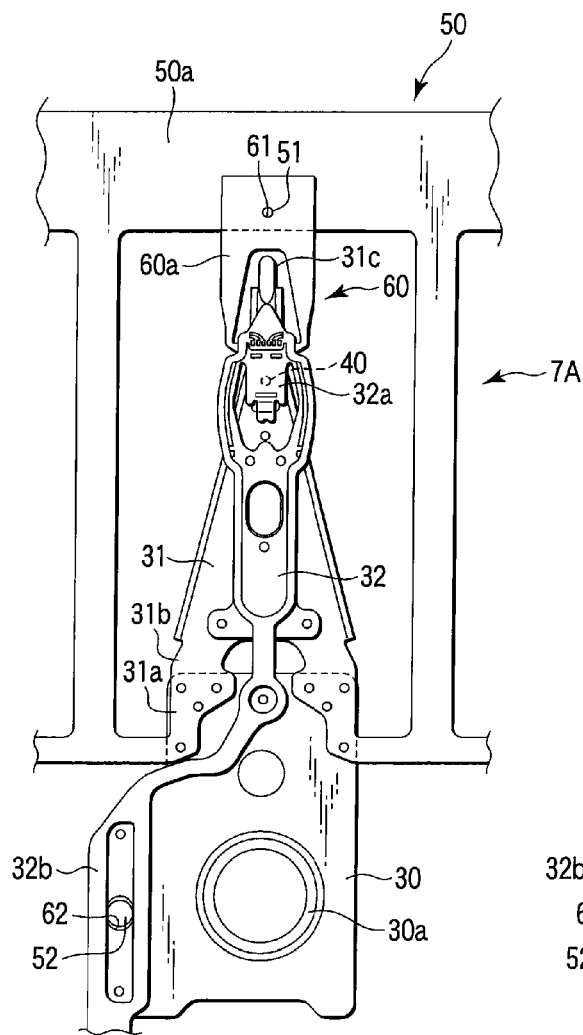
FIG. 2C is a plan view of a suspension assembly comprising the load beam blank, flexure blank, and baseplate.
Figure 2D:
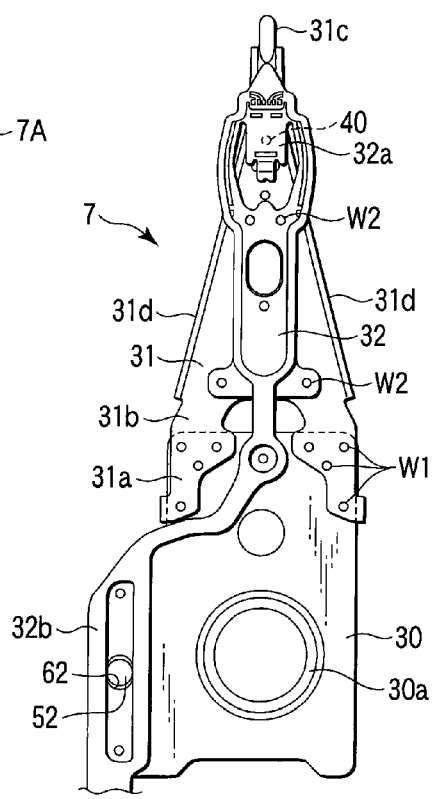
FIG. 2D is a plan view of a completed suspension.
Figure 4:
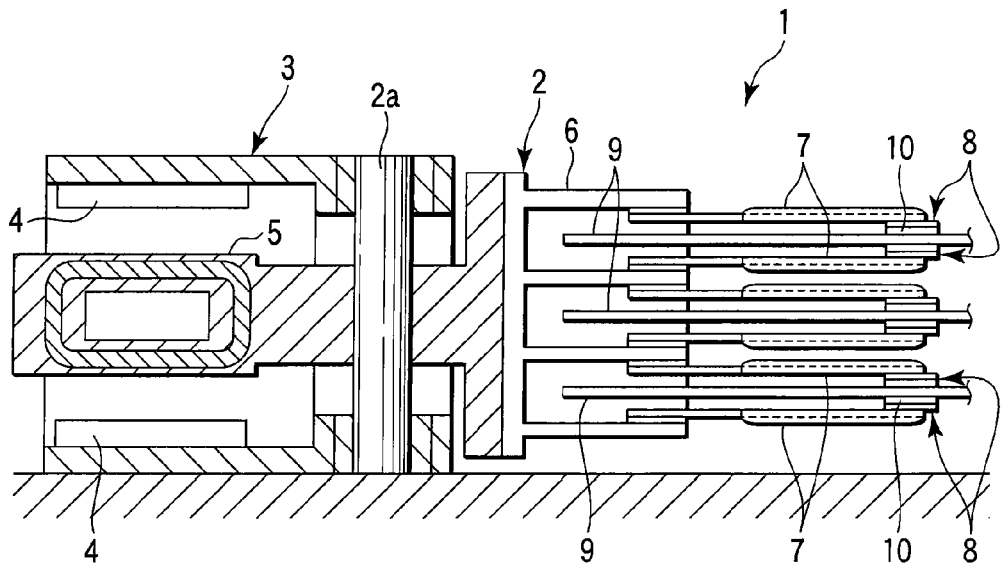
FIG. 4 is a sectional view showing an example of a hard disk drive.
Figure 5:
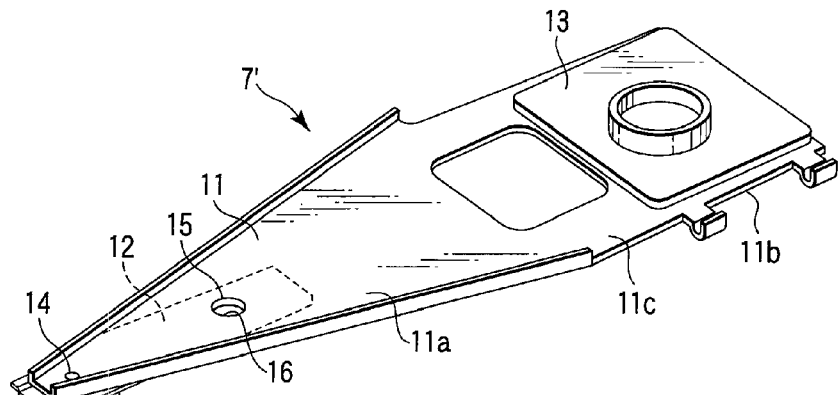
FIG. 5 is a perspective view of a prior art suspension.
Figure 6:
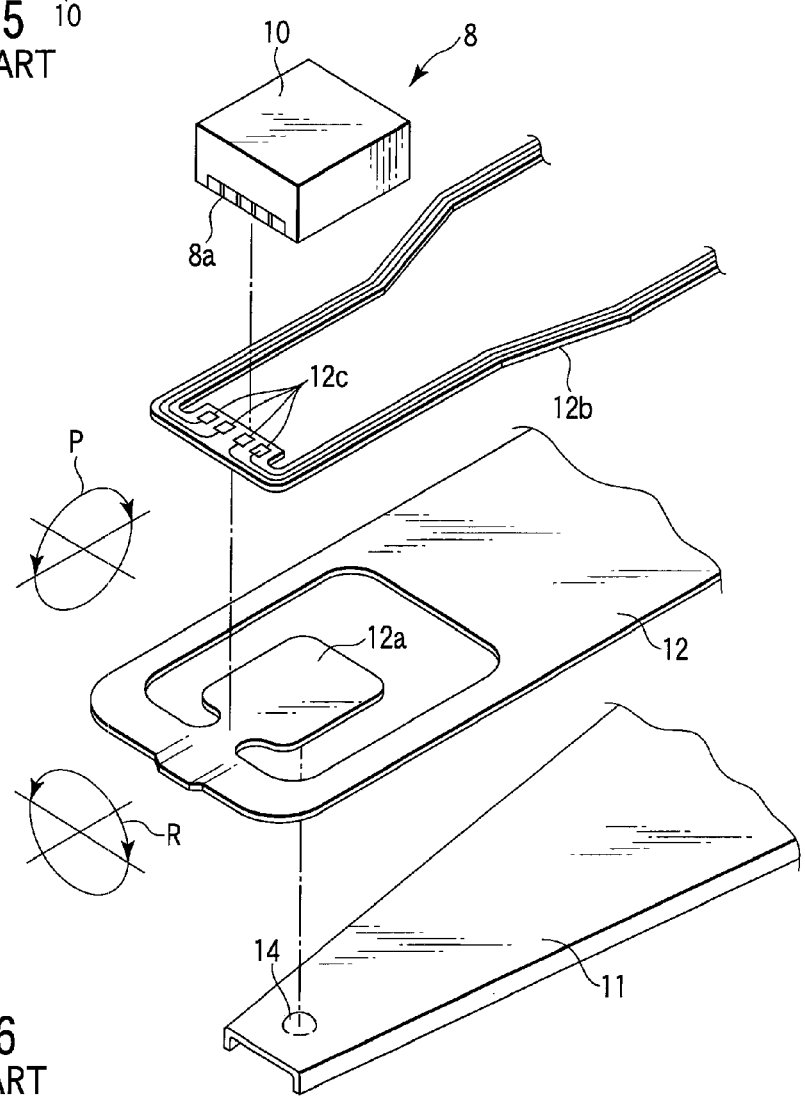
FIG. 6 is an exploded perspective view of a gimbal portion of the suspension shown in FIG. 5.
Figure 7:
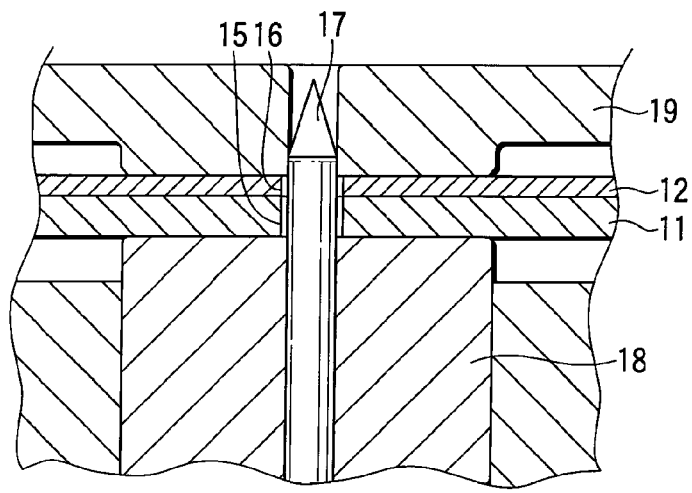
FIG. 7 is a sectional view showing a load beam, flexure, and clamping member of a prior art suspension.
Figure 8:
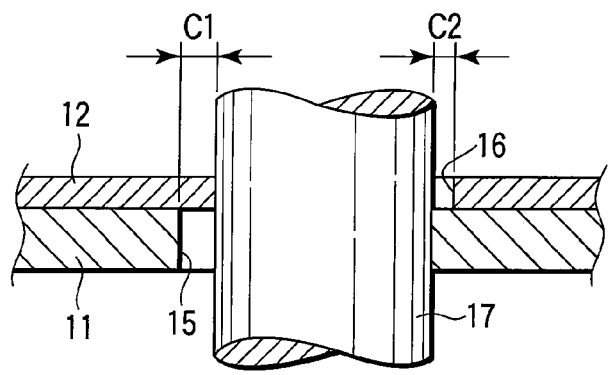
FIG. 8 is a sectional view showing clearances between a jig pin and reference holes of a prior art suspension.
Figure 9:
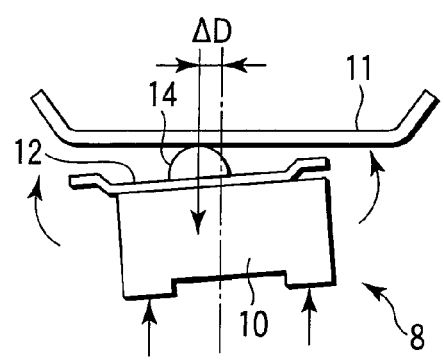
FIG. 9 is a front view showing a dimple dislocation of a head portion of a prior art suspension.

FIG. 2D shows an example of a magnetic head supporting suspension 7. The suspension 7 comprises a baseplate 30, load beam 31, flexure 32 with conductors, etc. A boss portion 30a of the baseplate 30 is fixed to an arm 6 of the carriage 2 (FIG. 4). FIG. 2C shows a suspension assembly 7A obtained in the process of manufacture of the suspension 7.

The load beam 31 comprises a proximal portion 31a fixed to the baseplate 30, hinge portion 31b capable of bending about a lateral axis, and distal end portion 31c. A dimple 40 is disposed near the distal end portion 31c of the load beam 31. The flexure 32 extends along an axis X1 (FIG. 1B) of the load beam 31. A part of the flexure 32 overlaps the load beam 31 and is fixed to the load beam 31 by fixing means, such as laser welding. In FIG. 2D, symbols W1 and W2 designate weld beads between the baseplate 30 and load beam 31 and between the load beam 31 and flexure 32, respectively. A tongue portion 32a is formed near the distal end of the flexure 32. The tongue portion 32a is pivotable in a rolling direction, pitching direction, etc., around the dimple 40. The tongue portion 32a and dimple 40 constitute a gimbal portion of the flexure 32. The extending portion 32b formed on a rear part of the flexure 32 is fixed to the baseplate 30.

The dimple 40 may be disposed on either the load beam 31 or the flexure 32. In an example shown in FIG. 3A, the dimple 40 is formed on the load beam 31. In the embodiment described below, the dimple 40 is disposed on the load beam 31. In a suspension shown in FIG. 3C, on the other hand, the dimple 40 is disposed on the flexure 32, and the load beam 31 comprises a portion 31f in contact with the dimple 40. Thus, also in the case where the dimple 40 is disposed on the flexure 32, other configurations than the relative position of the dimple 40 are the same as those of the following embodiment, so that a description thereof is omitted.

FIG. 1A shows a load beam blank 50 comprising the load beam 31 before bending work. The load beam blank 50 is formed from a metal plate (thin-plate spring) by a conventional processing method, such as etching or press working. The load beam blank 50 comprises the load beam 31 to become a product and a first frame portion 50a to be scrapped outside the product.

FIG. 1B shows the load beam blank 50 after the bending work. In the bending work, opposite side edges 31d, bent portion 31e, etc., of the load beam 31 are formed by means of a press tool. The frame portion 50a of the load beam blank 50 is separated from the load beam 31 as the load beam 31 and flexure 32 are combined to complete the suspension 7. In FIG. 1B, two-dot chain lines L1 individually represent cuttable portions at which the frame portion 50a is expected to be cut off. The frame portion 50a of the load beam blank 50 is not limited to the shape that surrounds the load beam 31, as shown in FIGS. 1A and 1B, and may have the shape of, for example, a projected piece.

As shown in FIG. 1B, the dimple 40 is formed on the load beam 31 of the load beam blank 50. The dimple 40 and the tongue portion 32a of the flexure 32 constitute the gimbal portion that supports a magnetic head 8 on the suspension 7. Further, a positioning projection 51 is formed on the frame portion 50a of the load beam blank 50. The projection 51 is an example of a positioning part according to the present invention, which is used to position the load beam 31 and flexure 32.

Figure 10:
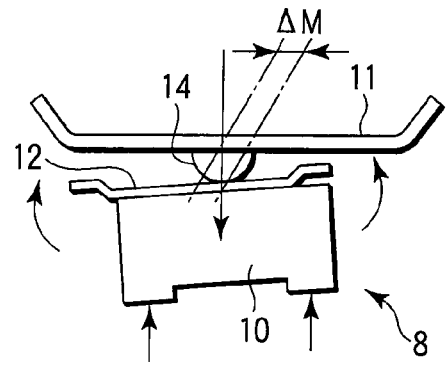
FIG. 10 is a front view showing a moment deviation of the head portion of a prior art suspension.
Figure 11:
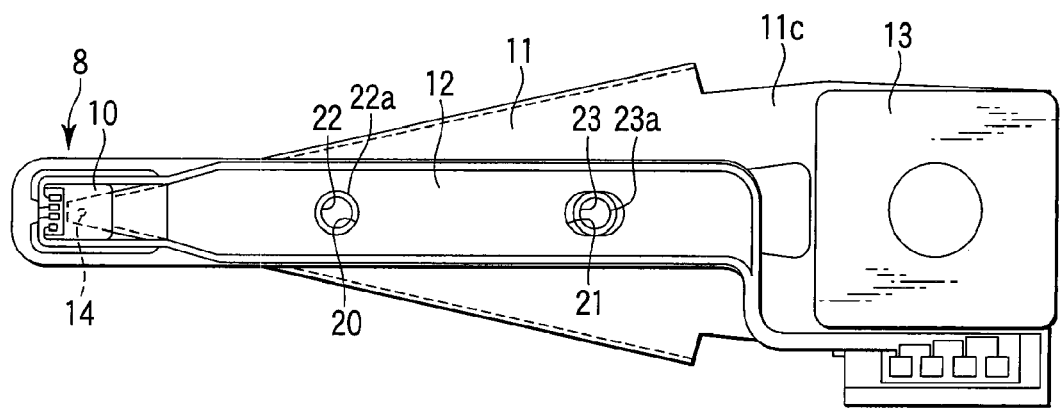
FIG. 11 is a plan view of a prior art suspension comprising reference holes and burred holes for positioning.

As shown in FIG. 10, the dimple 40 and positioning projection 51 are simultaneously formed by a die set 55 that comprises a punch 55a and die 55b. In this specification, to "formed simultaneously" means to be formed without changing the held state of the load beam blank 50. Accordingly, the dimple 40 and positioning projection 51 may be formed with a difference in time. Further, the dimple 40 and projection 51 may be independently formed by means of two die sets. Alternatively, after the dimple 40 is formed by a single die set in a first step, the die set or load beam blank 50 may be moved so that the positioning projection 51 can be formed in a second step. In order to improve the processing accuracy and reduce the processing time, the dimple 40 and positioning projection 51 should preferably be formed in a single step using a single die set.

As shown in FIG. 1B, the dimple 40 is formed near the distal end portion 31c of the load beam 31. Further, the positioning projection 51 is formed near that part of the frame portion 50a which is located closest to the dimple 40. By doing this, the accuracy of positioning of the dimple 40 and the tongue portion 32a of the flexure 32 can be further improved. In the present embodiment, the dimple 40 and positioning projection 51 are formed on axis X1 that extends longitudinally relative to the load beam 31. Although a step of forming the dimple 40 and positioning projection 51 should be performed simultaneously with the bending work for the load beam 31, it may alternatively be performed in a step separate from the bending work.

Figure 3A:
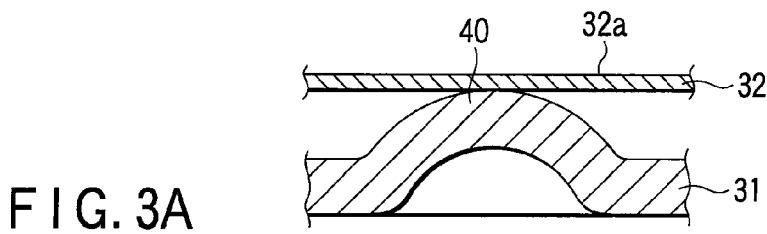
FIG. 3A is a sectional view showing a dimple and a part of a flexure of the suspension assembly shown in FIG. 2C.
Figure 3B:
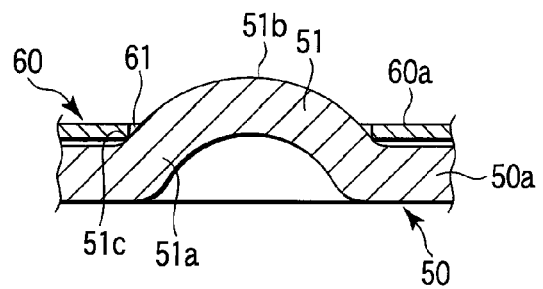
FIG. 3B is a sectional view showing a positioning projection and a reference hole of the suspension assembly shown in FIG. 2C.
Figure 3C:
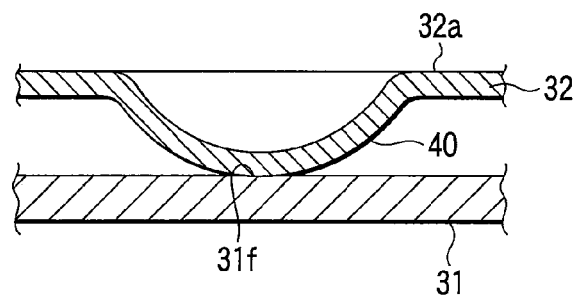
FIG. 3C is a sectional view partially showing a flexure and load beam of a suspension according to another embodiment of the invention.

As shown in FIG. 3A, an example of the dimple 40 is a substantially hemispherical (or domed) protuberance. As shown in FIG. 3B, the positioning projection 51 is also domed. The projection 51 projects in the same direction as the dimple 40. The projection 51 may be columnar. Further, it may be replaced with a burred hole having a projecting edge on its inner periphery. In short, the positioning projection 51 should only be shaped so that it can be fitted into a reference hole 61 (described later) and is not restricted in shape and size.

The load beam blank 50 is provided with an anti-rotation portion 52 (FIGS. 2C and 2D) in addition to the positioning projection 51. An example of the anti-rotation portion 52 is a projection that projects relative to the thickness of the load beam blank 50. The anti-rotation portion 52 may be disposed on the load beam 31 or another member (not shown) attached to the frame portion 50a. The anti-rotation portion 52 is inserted into an anti-rotation receiving portion 62 of a flexure blank 60 (described later).

The anti-rotation portion 52, like the positioning projection 51, may be in the form of a hemispherical protuberance or burred hole having a projecting edge. Since the anti-rotation portion 52 formed of the protuberance should only be shaped so as to be insertable into the receiving portion 62 in the form of a hole or slit, its specific shape and size are not critical. A distance from the dimple 40 to the anti-rotation portion 52 is more than twice as great as a distance S1 (FIG. 1B) from the dimple 40 to the positioning projection 51.

FIG. 2A shows the flexure blank 60. The flexure blank 60 is formed from a metal plate (thin-plate spring) by a conventional processing method, such as etching or press working. The flexure blank 60 comprises the flexure 32 to become a product and a second frame portion 60a to be scrapped outside the product. The flexure 32 is continuous with the frame portion 60a. The frame portion 60a is separated from the flexure 32 as the load beam 31 and flexure 32 are combined to complete the suspension 7. In FIG. 2A, two-dot chain line L2 represents a cuttable portion at which the frame portion 60a is expected to be cut off. The frame portion 60a is not limited to the shape shown in FIG. 2A and may have the shape of, for example, a projected piece.

As shown in FIG. 2A, the reference hole 61 is formed in the frame portion 60a of the flexure blank 60. The reference hole 61 is an example of a fitting portion according to the present invention, which is formed in a position corresponding to the positioning projection 51 of the load beam blank 50. The anti-rotation receiving portion 62 is formed at the extending portion 32b of the flexure 32. An example of the receiving portion 62 is an elongated hole extending along an axis X2 (FIG. 2A) of the flexure 32. The flexure 32 is prevented from rotating with respect to the load beam 31 as the anti-rotation portion 52 is inserted into the receiving portion 62. Since the receiving portion 62 should only be formed in a position corresponding to the anti-rotation portion 52, it may be formed in another position on the flexure blank 60. FIG. 2B shows an example of the baseplate 30. The baseplate 30 is fixed to the proximal portion 31a of the load beam 31.

The load beam blank 50, flexure blank 60, and baseplate 30 described above constitute the suspension assembly 7A shown in FIG. 2C. In assembling the suspension assembly 7A, the load beam blank 50 and flexure blank 60 are superposed, and the positioning projection 51 on the frame portion 50a of the load beam blank 50 is inserted into the reference hole 61 in the frame portion 60a of the flexure blank 60.

If the load beam blank 50 and flexure blank 60 are thus superposed, the tip of the dimple 40 contacts the tongue portion 32a of the flexure 32, as shown in FIG. 3A. As shown in FIG. 3B, moreover, the positioning projection 51 is fitted into the reference hole 61. The positioning projection 51 is shaped so that its outside diameter is reduced from its proximal portion 51a toward a tip 51b. The outside diameter of the proximal portion 51a is greater than or equal to the inside diameter of the reference hole 61. Thus, the load beam blank 50 and flexure blank 60 are positioned as an elevationally intermediate portion 51c of the positioning projection 51 engages with the inner peripheral edge of the reference hole 61. In this case, no clearance is defined between the projection 51 and hole 61.

As previously mentioned, the positioning projection 51 is inserted into the reference hole 61, and the anti-rotation portion 52 into the anti-rotation receiving portion 62. The anti-rotation portion 52 is located differently from the projection 51. As the anti-rotation portion 52 is fitted into the receiving portion 62, the load beam blank 50 and flexure blank 60 are prevented from rotating with respect to each other. Thus, the relative positions of the load beam blank 50 and flexure blank 60 can be accurately settled.

In an alternative embodiment, a convex anti-rotation portion may be formed on the flexure 32 or the frame portion 60a of the flexure blank 60, and a receiving portion in the form of a hole in the load beam 31 or the frame portion 50a of the load beam blank 50. In each of the embodiments described above, the flexure blank 60 is prevented from rotating with respect to the load beam blank 50 by fitting the anti-rotation portion on one of the blanks 50 and 60 into the receiving portion of the other.

Alternatively, the flexure blank may be prevented from rotating with respect to the load beam blank by inserting a jig pin into anti-rotation holes formed in the two blanks, individually. In conclusion, in the suspension assembly according to the present invention, the load beam blank and flexure blank are positioned with respect to each other as the positioning part and fitting portion are fitted to each other, and the load beam blank and flexure blank are prevented from relatively rotating as the anti-rotation portion and receiving portion are fitted to each other. The positioning part and fitting portion may be of any desired shapes only if they can achieve these purposes. The anti-rotation portion and receiving portion may also be of any desired shapes.

With the load beam blank 50 and flexure blank 60 positioned in the manner shown in FIG. 2C, the load beam 31 and flexure 32 are fixed to each other by adhesive bonding or laser welding. Thereafter, the frame portion 50a of the load beam blank 50 is separated from the load beam 31. Further, the frame portion 60a of the flexure blank 60 is separated from the flexure 32, whereupon the suspension 7 shown in FIG. 2D is completed.

In the embodiments described above, the dimple 40 and positioning projection 51 on the load beam blank 50 are simultaneously formed by the die set 55 (FIG. 1C). The flexure 32 is positioned with respect to the load beam 31 as the projection 51 is fitted into the reference hole 61, as shown in FIG. 3B. The projection 51 is a part of the frame portion 50a of the load beam blank 50 and is formed near the dimple 40. Therefore, the accuracy of the relative positions of the dimple 40 and the tongue portion 32a of the flexure 32 is very high. Thus, the tongue portion 32a and dimple 40 can constitute the highly precise gimbal portion.

In the prior art suspension shown in FIGS. 12A to 12C, the jig pins are inserted individually into the two pairs of reference holes, so that relatively large clearances need to be formed between the jig pins and the respective inner surfaces of the reference holes. In the suspension 7 of the present embodiment, on the other hand, the positioning projection 51 on the frame portion 50a of the load beam blank 50 is inserted into the reference hole 61 of the flexure blank 60, and the anti-rotation portion 52 into the receiving portion 62. Thus, the conventionally required clearances can be obviated. In addition, both the positioning projection 51 and reference hole 61 are formed on or in the frame portions (scrap portions) 50a and 60a. In positioning, therefore, the load beam 31 and flexure 32 can be prevented from being damaged, so that the quality of the suspension 7 is improved. Further, the accuracy of the relative positions of the dimple 40 and the tongue portion 32a of the flexure 32, which is most expected to be high precise for the suspension 7, can be made very high. Consequently, high alignment accuracy can be obtained for the relative positions of the dimple 40 and the tongue portion 32a on which the slider 10 is mounted.

After the load beam blank 50 and flexure blank 60 are assembled and fixed together, as shown in FIG. 2C, the frame portions 50a and 60a are separated from the load beam 31 and flexure 32, respectively. Therefore, the fitting portion between the projection 51 and hole 61 that causes contamination can be prevented from remaining in the completed suspension 7. Thus, the possibility of the completed suspension 7 suffering burring or contamination can be reduced.

In the present embodiment, the positioning projection 51 is formed on the frame portion 50a located outside the load beam 31, and the reference hole 61 in the frame portion 60a outside the flexure 32. Therefore, a distance from the positioning projection 51 to the anti-rotation portion 52 can be increased. Thus, the accuracy of the relative positions of the load beam 31 and flexure 32 can be improved.

In connection with the above-described embodiments, the load beam and flexure have been described as examples of members to be positioned with respect to each other. However, the present invention is also applicable to positioning of the load beam and hinge member of a suspension in which these members are constructed independently of each other. In this case, a step of fixing the hinge member to the load beam is performed in addition to a step of fixing the flexure to the load beam. Further, the anti-rotation portion is formed at a distance from the positioning portion. By doing this, the relative positions of the load beam, flexure, and hinge member can be accurately regulated.

The present invention is not limited to the embodiments described herein and may be embodied in various forms without departing from the spirit or scope of the invention. The invention may also be applied to suspensions of disk drives other than hard disk drives. In the embodiments described above, the dimple and positioning part (a projection for example) are simultaneously formed in a first step using a single die set. In an alternative embodiment, however, the dimple may be formed in the first step using the single die set, and the positioning part in a second step. Alternatively, the dimple and positioning part may be independently formed by means of two die sets. Further, a projection that functions as a positioning part may be formed on the frame portion of the flexure, and a hole that functions as a fitting portion in the frame portion of the load beam blank. Alternatively, a positioning projection may be formed on the hinge member.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A manufacturing method for a magnetic head supporting suspension comprising a load beam and a flexure fixed to the load beam, comprising steps of:
   forming a load beam blank comprising the load beam and a frame portion continuous with the load beam;
   forming a flexure blank comprising the flexure and a frame portion continuous with the flexure;
   forming a dimple on that part of the load beam which corresponds in position to a tongue portion of the flexure and forming a positioning part on the frame portion of the load beam blank;
   forming a fitting portion in that part of the flexure blank which corresponds in position to the positioning part, the fitting portion being fittable to the positioning part;
   forming an anti-rotation portion on the load beam blank or a member attached to the load beam blank;
   forming a receiving portion in that part of the flexure blank which corresponds in position to the anti-rotation portion, the receiving portion being fittable to the anti-rotation portion;
   superposing the load beam blank and the flexure blank on each other and fitting the positioning part to the fitting portion;
   fitting the anti-rotation portion to the receiving portion;
   fixing the flexure to the load beam; and separating the load beam and the flexure from the frame portions of the load beam blank and the flexure blank, respectively, after the fixing of the flexure to the load beam.

2. A manufacturing method according to claim 1, further comprising a step of fixing a hinge member to the load beam.

3. A manufacturing method according to claim 1, wherein the dimple and the positioning part are formed in a single step using a single die set.

4. A manufacturing method according to claim 1, wherein the dimple and the positioning part are formed in first and second steps, respectively, using a single die set.

5. A manufacturing method according to claim 1, wherein the dimple and the positioning part are separately formed using two die sets.

* * * * *